United States Patent
McGee et al.

(10) Patent No.: US 9,144,904 B2
(45) Date of Patent: Sep. 29, 2015

(54) METHOD AND SYSTEM FOR AUTOMATICALLY PREVENTING DEADLOCK IN MULTI-ROBOT SYSTEMS

(75) Inventors: H. Dean McGee, Rochester Hills, MI (US); Tien L. Chang, Troy, MI (US); Peter Swanson, Lake Orion, MI (US); Jianming Tao, Troy, MI (US); Di Xiao, Rochester Hills, MI (US); Ho Cheung Wong, Troy, MI (US); Sai-Kai Cheng, Rochester Hills, MI (US); Jason Tsai, Bloomfield Hills, MI (US)

(73) Assignee: Fanuc Robotics America Corporation, Rochester Hills, MI (US)

( * ) Notice: Subject to any disclaimer, the term of this patent is extended or adjusted under 35 U.S.C. 154(b) by 283 days.

(21) Appl. No.: 13/462,234

(22) Filed: May 2, 2012

(65) Prior Publication Data

US 2012/0215351 A1    Aug. 23, 2012

Related U.S. Application Data

(63) Continuation-in-part of application No. 12/124,430, filed on May 21, 2008, now Pat. No. 8,315,738.

(60) Provisional application No. 61/482,808, filed on May 5, 2011.

(51) Int. Cl.
   *B25J 9/16* (2006.01)

(52) U.S. Cl.
   CPC .............. *B25J 9/1666* (2013.01); *B25J 9/1676* (2013.01); *G05B 2219/39135* (2013.01); *G05B 2219/40442* (2013.01); *G05B 2219/40477* (2013.01); *G05B 2219/40492* (2013.01)

(58) Field of Classification Search
   CPC ................. B25J 9/1666; B25J 9/1676; G05B 2219/404926; G05B 2219/40442; G05B 2219/40477; G05B 2219/39135
   USPC .................................................. 700/248–255
   See application file for complete search history.

(56) References Cited

U.S. PATENT DOCUMENTS

| | | |
|---|---|---|
| 5,150,452 A | 9/1992 | Pollack et al. |
| 5,161,936 A | 11/1992 | Kato |

(Continued)

FOREIGN PATENT DOCUMENTS

WO    2007121357 A2    10/2007

OTHER PUBLICATIONS

Markus Jager, Decentralized Collision Avoidance, Deadlock Detection, and Deadlock Resolution for Multiple Mobile Robots, 2001, IEEE, International Conference on Intelligent Robots and Systems.*

*Primary Examiner* — John Q Nguyen
*Assistant Examiner* — Jordan S Fei
(74) *Attorney, Agent, or Firm* — Fraser Clemens Martin & Miller LLC; William J. Clemens

(57) ABSTRACT

A system and method for controlling avoiding collisions and deadlocks in a workcell containing multiple robots automatically determines the potential deadlock conditions and identifies a way to avoid these conditions. Deadlock conditions are eliminated by determining the deadlock-free motion statements prior to execution of the motions that have potential deadlock conditions. This determination of deadlock-free motion statements can be done offline, outside normal execution, or it can be done during normal production execution. If there is sufficient CPU processing time available, the determination during normal production execution provides the most flexibility to respond to dynamic conditions such as changes in I/O timing or the timing of external events or sequences. For minimal CPU impact the determination is done offline where many permutations of programming sequences can be analyzed and an optimized sequence of execution may be found.

13 Claims, 16 Drawing Sheets

(56) References Cited

U.S. PATENT DOCUMENTS

| | | |
|---|---|---|
| 5,347,459 A | 9/1994 | Greenspan et al. |
| 5,561,742 A | 10/1996 | Terada et al. |
| 7,114,157 B2 | 9/2006 | Chaffee et al. |
| 2003/0100957 A1* | 5/2003 | Chaffee et al. ......... 700/18 |
| 2003/0225479 A1 | 12/2003 | Waled |
| 2007/0150093 A1* | 6/2007 | Nagatsuka et al. ......... 700/235 |
| 2009/0326711 A1 | 12/2009 | Chang et al. |

* cited by examiner

| DEADLOCK FREE MATRIX | | | | | | | | | | |
|---|---|---|---|---|---|---|---|---|---|---|
| | PROGRAM LINE B NUMBERS | | | | | | | | | |
| | 1 | 2 | 3 | 4 | 5 | 6 | 7 | 8 | 9 | 10 |
| 1 | 0 | 0 | 0 | 0 | 0 | 0 | 0 | 0 | 0 | 0 |
| 2 | 0 | 0 | 0 | 0 | 0 | 0 | 0 | 0 | 0 | 0 |
| 3 | 0 | 0 | 0 | | | 1 | 1 | 0 | 0 | 0 |
| 4 | 0 | 0 | 0 | | 1 | 1 | 1 | 0 | 0 | 0 |
| 5 | 0 | 0 | 0 | 1 | 1 | 1 | 1 | 0 | 0 | 0 |
| 6 | 0 | 0 | 0 | 0 | 0 | 0 | 0 | 0 | 0 | 0 |
| 7 | 0 | 0 | 0 | 0 | 0 | 0 | 0 | 0 | 0 | 0 |
| 8 | 0 | 0 | 0 | 0 | 0 | 0 | 0 | 0 | 0 | 0 |
| 9 | 0 | 0 | 0 | 0 | 0 | 0 | 0 | 0 | 0 | 0 |
| 10 | 0 | 0 | 0 | 0 | 0 | 0 | 0 | 0 | 0 | 0 |

(PROGRAM A LINE NUMBERS)

400

| ORIGNAL PROGRAM A | |
|---|---|
| 1 | L P[1] 2000MM/SEC FINE |
| 2 | L P[2] 2000MM/SEC FINE |
| 3 | L P[3] 2000MM/SEC FINE |
| 4 | L P[4] 2000MM/SEC FINE |
| 5 | L P[5] 2000MM/SEC FINE |
| 6 | L P[6] 2000MM/SEC FINE |
| 7 | L P[7] 2000MM/SEC FINE |
| 8 | L P[8] 2000MM/SEC FINE |
| 9 | L P[9] 2000MM/SEC FINE |
| 10 | L P[10] 2000MM/SEC FINE |

| NEW PROGRAM A | |
|---|---|
| 1 | L P[1] 2000MM/SEC FINE |
| 2 | L P[2] 2000MM/SEC FINE |
| 3 | ENTER ZONE [1] |
| 4 | L P[3] 2000MM/SEC FINE |
| 5 | L P[4] 2000MM/SEC FINE |
| 6 | L P[5] 2000MM/SEC FINE |
| 7 | EXIT ZONE [1] |
| 8 | L P[6] 2000MM/SEC FINE |
| 9 | L P[7] 2000MM/SEC FINE |
| 10 | L P[8] 2000MM/SEC FINE |
| 11 | L P[9] 2000MM/SEC FINE |
| 12 | L P[10] 2000MM/SEC FINE |

402

| ORIGNAL PROGRAM B | |
|---|---|
| 1 | L P[1] 2000MM/SEC FINE |
| 2 | L P[2] 2000MM/SEC FINE |
| 3 | L P[3] 2000MM/SEC FINE |
| 4 | L P[4] 2000MM/SEC FINE |
| 5 | L P[5] 2000MM/SEC FINE |
| 6 | L P[6] 2000MM/SEC FINE |
| 7 | L P[7] 2000MM/SEC FINE |
| 8 | L P[8] 2000MM/SEC FINE |
| 9 | L P[9] 2000MM/SEC FINE |
| 10 | L P[10] 2000MM/SEC FINE |

| INTERFERENCE MATRIX | | | | | | | | | | |
|---|---|---|---|---|---|---|---|---|---|---|
| | PROGRAM LINE B NUMBERS | | | | | | | | | |
| | 1 | 2 | 3 | 4 | 5 | 6 | 7 | 8 | 9 | 10 |
| 1 | 0 | 0 | 0 | 0 | 0 | 0 | 0 | 0 | 0 | 0 |
| 2 | 0 | 0 | 0 | 0 | 0 | 0 | 0 | 0 | 0 | 0 |
| 3 | 0 | 0 | 1 | 1 | 1 | 1 | 1 | 0 | 0 | 0 |
| 4 | 0 | 0 | 0 | 0 | 1 | 1 | 1 | 0 | 0 | 0 |
| 5 | 0 | 0 | 0 | 1 | 1 | 1 | 1 | 0 | 0 | 0 |
| 6 | 0 | 0 | 0 | 0 | 0 | 1 | 1 | 0 | 0 | 0 |
| 7 | 0 | 0 | 0 | 0 | 0 | 0 | 0 | 0 | 0 | 0 |
| 8 | 0 | 0 | 0 | 0 | 0 | 0 | 0 | 0 | 0 | 0 |
| 9 | 0 | 0 | 0 | 0 | 0 | 0 | 0 | 0 | 0 | 0 |
| 10 | 0 | 0 | 0 | 0 | 0 | 0 | 0 | 0 | 0 | 0 |

(PROGRAM A LINE NUMBERS)

405

| | ORIGNAL PROGRAM A |
|---|---|
| 1 | L P[1]  2000MM/SEC FINE |
| 2 | L P[2]  2000MM/SEC FINE |
| 3 | L P[3]  2000MM/SEC FINE |
| 4 | L P[4]  2000MM/SEC FINE |
| 5 | L P[5]  2000MM/SEC FINE |
| 6 | L P[6]  2000MM/SEC FINE |
| 7 | L P[7]  2000MM/SEC FINE |
| 8 | L P[8]  2000MM/SEC FINE |
| 9 | L P[9]  2000MM/SEC FINE |
| 10 | L P[10]  2000MM/SEC FINE |

| NEW PROGRAM A | |
|---|---|
| 1 | L P[1] 2000MM/SEC FINE |
| 2 | L P[2] 2000MM/SEC FINE |
| 3 | ENTER ZONE [1] |
| 4 | L P[3] 2000MM/SEC FINE |
| 5 | EXIT ZONE [1] |
| 6 | ENTER ZONE [2] |
| 7 | L P[4] 2000MM/SEC FINE |
| 8 | L P[5] 2000MM/SEC FINE |
| 9 | EXIT ZONE [2] |
| 10 | ENTER ZONE [3] |
| 11 | L P[6] 2000MM/SEC FINE |
| 12 | EXIT ZONE [3] |
| 13 | L P[7] 2000MM/SEC FINE |
| 14 | L P[8] 2000MM/SEC FINE |
| 15 | L P[9] 2000MM/SEC FINE |
| 16 | L P[10] 2000MM/SEC FINE |

FIG.8 (CONTINUED)

| DEADLOCK FREE MATRIX | | | | | | | | | | |
|---|---|---|---|---|---|---|---|---|---|---|
| | PROGRAM LINE B NUMBERS | | | | | | | | | |
| | | 1 | 2 | 3 | 4 | 5 | 6 | 7 | 8 | 9 | 10 |
| PROGRAM A LINE NUMBERS | 1 | 0 | 0 | 0 | 0 | 0 | 0 | 0 | 0 | 0 | 0 |
| | 2 | 0 | 0 | 0 | 0 | 0 | 0 | 0 | 0 | 0 | 0 |
| | 3 | 0 | 0 | 1 | 1 | 1 | 1 | 1 | 0 | 0 | 0 |
| | 4 | 0 | 0 | 0 | 1 | 1 | 1 | 1 | 0 | 0 | 0 |
| | 5 | 0 | 0 | 0 | 1 | 1 | 1 | 1 | 0 | 0 | 0 |
| | 6 | 0 | 0 | 0 | 0 | 0 | 1 | 1 | 0 | 0 | 0 |
| | 7 | 0 | 0 | 0 | 0 | 0 | 0 | 0 | 0 | 0 | 0 |
| | 8 | 0 | 0 | 0 | 0 | 0 | 0 | 0 | 0 | 0 | 0 |
| | 9 | 0 | 0 | 0 | 0 | 0 | 0 | 0 | 0 | 0 | 0 |
| | 10 | 0 | 0 | 0 | 0 | 0 | 0 | 0 | 0 | 0 | 0 |

407

| ORIGNAL PROGRAM B | |
|---|---|
| 1 | L P[1] 2000MM/SEC FINE |
| 2 | L P[2] 2000MM/SEC FINE |
| 3 | L P[3] 2000MM/SEC FINE |
| 4 | L P[4] 2000MM/SEC FINE |
| 5 | L P[5] 2000MM/SEC FINE |
| 6 | L P[6] 2000MM/SEC FINE |
| 7 | L P[7] 2000MM/SEC FINE |
| 8 | L P[8] 2000MM/SEC FINE |
| 9 | L P[9] 2000MM/SEC FINE |
| 10 | L P[10] 2000MM/SEC FINE |

| NEW PROGRAM B | |
|---|---|
| 1 | L P[1] 2000MM/SEC FINE |
| 2 | L P[2] 2000MM/SEC FINE |
| 3 | ENTER ZONE [1] |
| 4 | L P[3] 2000MM/SEC FINE |
| 5 | ENTER ZONE [2] |
| 6 | L P[4] 2000MM/SEC FINE |
| 7 | L P[5] 2000MM/SEC FINE |
| 8 | ENTER ZONE [3] |
| 9 | L P[6] 2000MM/SEC FINE |
| 10 | L P[7] 2000MM/SEC FINE |
| 11 | EXIT ZONE [1] |
| 12 | EXIT ZONE [2] |
| 13 | EXIT ZONE [3] |
| 14 | L P[8] 2000MM/SEC FINE |
| 15 | L P[9] 2000MM/SEC FINE |
| 16 | L P[10] 2000MM/SEC FINE |

**FIG.8
(CONTINUED)**

METHOD AND SYSTEM FOR AUTOMATICALLY PREVENTING DEADLOCK IN MULTI-ROBOT SYSTEMS

CROSS-REFERENCE TO RELATED APPLICATION

This application is a continuation-in-part of the co-pending U.S. patent application Ser. No. 12/124,430 filed May 21, 2008.

This application claims the benefit of U.S. provisional patent application Ser. No. 61/482,808 filed May 5, 2011.

FIELD OF THE INVENTION

The present invention relates generally to a system for controlling a plurality of robots and a method for controlling motion interference avoidance for the plurality of robots.

BACKGROUND OF THE INVENTION

Movement of objects in space is a necessary task in a typical manufacturing environment. Robotics have increasingly been employed to effect the necessary movement. However, when multiple objects are being moved, a potential for interference between the objects exists. An interference exists if the at least two objects share the same space at the same time, such as when the objects have the same coordinates with respect to a common frame of reference.

As modern industrial robots move at considerable velocities, interferences between robots can result in a collision and undesirable damage to the robots and work pieces being handled by the robots. The collisions may lead to costly down time in the manufacturing process. Accordingly, it is desirable to avoid such collisions.

Prior art systems and methods have been used in an attempt to minimize interferences and collisions. However, there are several shortcomings of the prior art systems and methods. Typically, a tool center point (TCP) is only checked relative to a predetermined interference area or "static space". For multiple robots, it is difficult to directly or effectively prevent the collision or interference thereof. Further, it is difficult to specify an interference space in respect of a static coordinate system for multiple moving robots. Any interference space is not only a function of the robot motion path, but also a function of the motion speed. Difficulty also exists in attempting to handle a deadlock situation when two or more robots request to move to a common space at the same time.

Prior art systems also attempt to prevent a TCP for a robot from colliding in a fixed space relative to its world coordinate system. When multiple robots (with multiple controllers) share common or "interference" spaces during a task execution, each controller has to wait until no robot is in the common spaces. Then the controller can then issue the motion control commands to allow the robot to move. This process is also called a "wait and move" process, which generally increases working cycle time. However, it is difficult to effectively specify an interference space in terms of a fixed coordinate system, because the interference space is not only the function of the robot motion path but also the motion speed. When more than one robot requests to move to a common space at the same time, it creates a deadlock situation where none of the robots can move because they are waiting for one another.

Prior art systems also attempt to model the robot by spheres and cylinders. These systems predict a future location of the robot during motion in real time. Because these systems do not determine the accumulated space occupied by the robot over time, these systems must perform comparison frequently during the robot motion. These systems compare element by element the models of all robots in the workcell. This comparison is very expensive computationally and the cost grows exponentially as the number of robots and elements used to model a robot and tooling is increased. Since the comparison is done real time when an impending collision is detected these systems generally must stop all robots involved in the impending collision and automatic programmed operation must cease. These systems become more difficult when the robots reside on different controllers because they require large amounts of information to be communicated real-time between controllers. Prior art systems also attempt to utilize I/O handshaking mechanism for interference avoidance. In present invention, there is no need for I/O PLC.

One known system and method is disclosed in Assignee's copending International Application No. PCT/US2007/066638, hereby incorporated herein by reference in its entirety. The system and method includes a "dynamic space check" system wherein an efficiency of robot operation is maximized and a potential for interference or collision of multiple robots is minimized. Robots controlled by each controller only work on a user-defined dynamic space, thus avoiding collision. However, the dynamic space check system generally protects a TCP only against a user-defined rectilinear space.

Another known method for avoiding robot collisions is reported in U.S. Pat. No. 5,150,452 to Pollack et al. The method includes creating a collision map containing a desired robot move. The initial position of the desired robot is removed from a "world" map by combining the robot map and the world map in a logical exclusive-OR operation and thereafter combining the collision map and the world map in a local exclusive-OR operation followed by combining the collision map and the world map in a logical inclusive-OR operation in a byte-by-byte manner. A collision is indicated by a difference in any bit position of the inclusive- and exclusive-OR combinations. The method provides a two dimensional x-y projection and one dimensional height for collision detection, but does not allow for three-dimensional, real time collision detection.

A further known method for detecting a collision between a robot and one or more obstacles before it occurs is described in U.S. Pat. No. 5,347,459 to Greenspan et al. The robot is modeled by spheres in a voxelized workspace. Each voxel within the workspace is assigned a value which corresponds to its distance from the closest obstacle. A collision is determined to be imminent if the voxel value at the center of a sphere is less than the radius of other sphere in voxels. The method merely protects a single robot arm, however. The robot is also modeled by spheres only, thereby resulting in insufficient protection of critical process paths of the robots.

There is a continuing need for a system and method for controlling motion interference avoidance for a plurality of robots. Desirably, the system and method provides a three dimensional and real time collision detection, communication of robotic motions to the robotic system in advance, reservation of programmed trajectories without collision, and protection of critical process paths.

Deadlock conditions occur when the programs or tasks are in such a state that continued sequential execution of any of the programs or tasks will result in interference between one or more robots associated with the programs or tasks and that there is no program or task that can proceed in the sequential manner without interference.

U.S. Pat. No. 7,114,157 to Chaffee et al. describes a method to avoid deadlock by acquiring resources in a set order. While this method can avoid deadlock, it provides no capability of allowing operation if the set deadlock-free order has not been determined. Furthermore, it does not allow operation that may be deadlock-free if the requested order is outside the prescribed deadlock-free order.

U.S. Patent Application Publication No. 2009/0326711 to Chang et al. describes a method of utilizing automatic zones to avoid deadlock either automatically or manually. Chang suggests a method of using priority values to prevent deadlock. Chang does not suggest a method of preventing deadlock where priority values are not used.

SUMMARY OF THE INVENTION

In concordance with the instant disclosure, a system and method for controlling motion interference avoidance for a plurality of robots, wherein the system and method provides a three dimensional and real time collision detection, communication of robotic motions to the robotic system in advance, reservation of programmed trajectories without collision, and protection of critical process paths without utilizing I/O handshaking mechanism, is surprisingly discovered.

In one embodiment, a method for preventing deadlock of a pair of robots which have a common workspace, each of the robots being controlled by an associated program wherein when the programs are executed concurrently each of the robots occupies at least a portion of the common workspace during a portion of execution of the associated program, said method comprising the steps of: during concurrent execution of the programs identifying portions of the common workspace occupied by the robots; identifying at least one interference region wherein the portions of the common workspace overlap; analyzing the at least one interference region and identifying where at least one deadlock condition of the two robots can occur; and avoiding the at least one deadlock condition during execution of the programs by automatically determining and executing at least one deadlock-free motion statement prior to execution of any motion of the robots that results in the at least one deadlock condition.

In a further embodiment, a computer readable media containing instructions executable by a computer to perform a method for preventing deadlock of a pair of robots which have a common workspace, each of the robots being controlled by an associated program wherein when the programs are executed concurrently each of the robots occupies at least a portion of the common workspace during a portion of execution of the associated program, the method comprising: during concurrent execution of the programs, the instructions identifying portions of the common workspace occupied by the robots; the instructions identifying at least one interference region wherein the portions of the common workspace overlap; the instructions analyzing the at least one interference region and identifying where at least one deadlock condition of the two robots can occur; and the instructions avoiding the at least one deadlock condition during execution of the programs by automatically determining and executing at least one deadlock-free motion statement prior to execution of any motion of the robots that results in the at least one deadlock condition.

In another embodiment, a method for preventing deadlock of a plurality of robots which have a common workspace, each of the robots being controlled by an associated program wherein when the programs are executed concurrently each of the robots occupies at least a portion of the common workspace during a portion of execution of the associated program, said method comprising the steps of: during concurrent execution of the programs identifying portions of the common workspace occupied by the robots; identifying at least one interference region wherein the portions of the common workspace overlap for at least two of the robots; analyzing the at least one interference region and identifying where at least one deadlock condition of the at least two robots can occur; and avoiding the at least one deadlock condition during execution of the programs by automatically determining and executing at least one deadlock-free motion statement prior to execution of any motion of the at least two robots that results in the at least one deadlock condition.

The system and method according to the invention does not require a previously known deadlock-free sequence. This system and method will automatically determine the potential deadlock conditions and identify a way to avoid these conditions. This system and method does not require priority values to prevent deadlock. This system and method prevents interference conditions and at the same time prevents the possibility of deadlock conditions to exist.

DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 8 shows an interference matrix and associated program listings according to the invention;

DESCRIPTION OF THE PREFERRED EMBODIMENT

Figure 1:
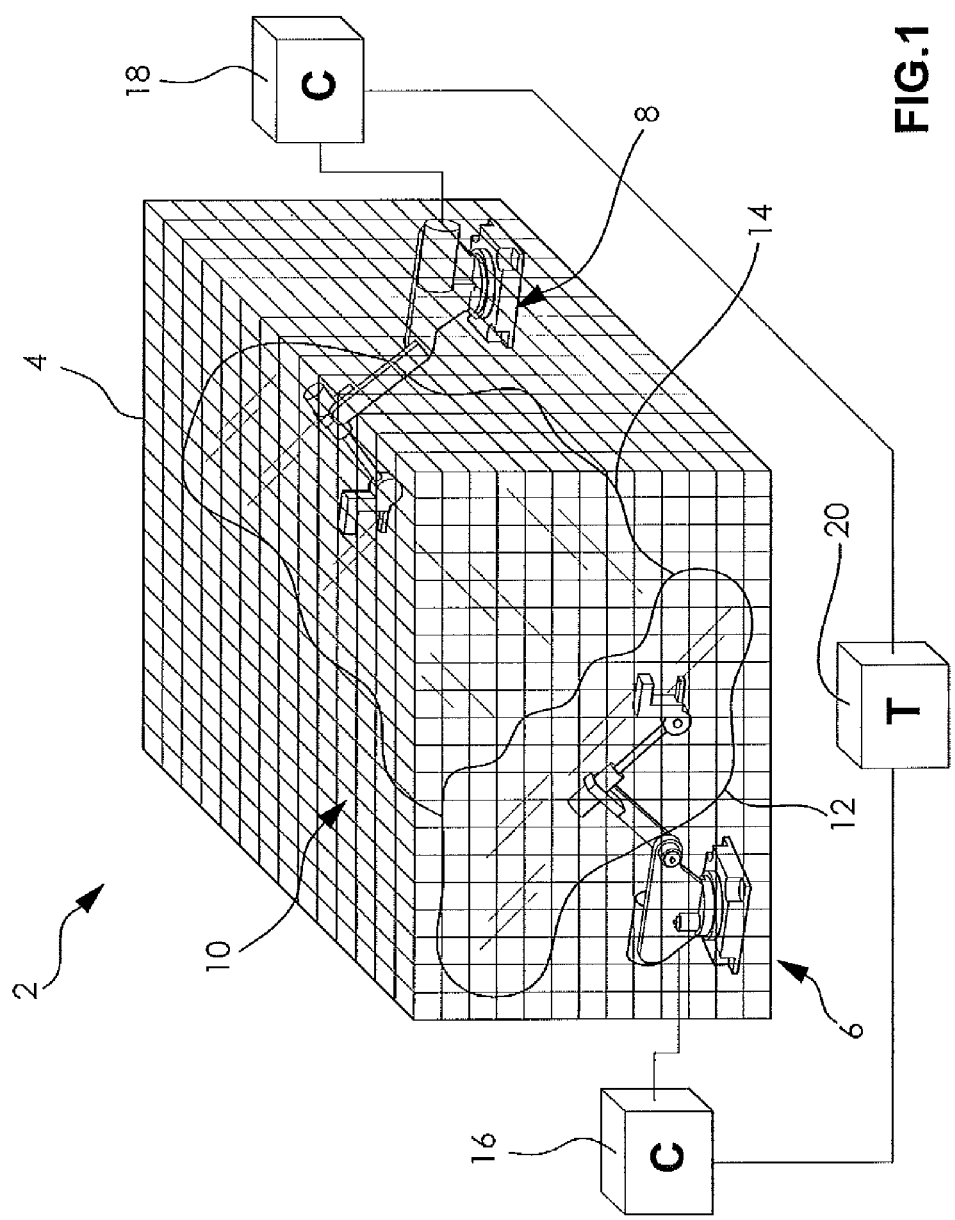
FIG. 1 shows an exemplary robotic system according to the present disclosure, having a first robot and a second robot operating within a workcell.

The following description is merely exemplary in nature and is not intended to limit the present disclosure, application, or uses. It should be understood that throughout the drawings, corresponding reference numerals also indicate like or corresponding parts and features. In respect of the methods disclosed, the steps presented are exemplary in nature, and thus, are not necessary or critical.

FIG. 1 is a schematic diagram showing a robotic system 2 for controlling collision avoidance between multiple robots. As nonlimiting examples, the robotic system 2 may be one of a body shop robot system, a waterjet cutting robot system, a laser welding robot system, an arc welding robot system, and a paint robot system having at least two robots. Other robotic systems 2 having a plurality of robots may also be employed, as desired.

The robotic system 2 includes a work cell 4 defining an envelope within which a first robot 6 and a second robot 8 are configured to operate. The first robot 6 and the second robot 8 are configured to selectively occupy at least one common space 10 disposed within the work cell 4. Although only a first robot 6 and a second robot 8 are illustrated, it should be appreciated that the robotic system 2 may have more than two robots without departing from the scope and spirit of the disclosure.

The first robot 6 may occupy a first portion 12 of the common space 10 during a movement of the first robot 6 along a first programmed path. The second robot 8 may occupy a second portion 14 of the common space 10 during a movement of the second robot 8 along a second programmed path. The first and second portions 12, 14 are also known as "automatic zones" or "autozones". Each programmed path comprises one or more automatic zones, and each automatic zone is pre-processed and derived from one or more motion statements. The first and second programmed paths may be controlled by one or more motion statements in a sequence of instructions having multiple motion statements, for example. A skilled artisan should understand that the first and second portions 12, 14 may overlap, thus resulting in a likelihood of robot collision absent the employment of an interference avoidance method for controlling the motions of the first and second robots 6, 8.

The first and second robots 6, 8 are controlled by at least one controller 16, 18. In the embodiment shown in FIG. 1, the first robot 6 is controlled by the first controller 16 and the second robot 8 is controlled by the second controller 18. The at least one controller 16, 18 is adapted for electrical communication with a source of electrical power (not shown). The controller 16, 18 can execute the sequence of instructions, such as a computer program, residing within the controller 16, 18. In other embodiments, the sequence of instructions may reside on a computer-readable medium or memory in communication with the controller 16, 18.

The robotic system 2 may further include other components known in the art, such as at least one of network media (not shown) configured to connect the various system components, a programmable logic device (not shown), and a teaching device 20 in electrical communication with the at least one controller 16, 18. In a particular embodiment, the teaching device 20 may include a monitor and is configured to graphically represent the first robot 6, the second robot 8, the first portion 12 of the common space 10, and the second portion 14 of the common space 10 for viewing by an operator of the robotic system 2, as desired. The teaching device 20 may include means for initiating a sequence of instructions to jog the robot.

Figure 2:
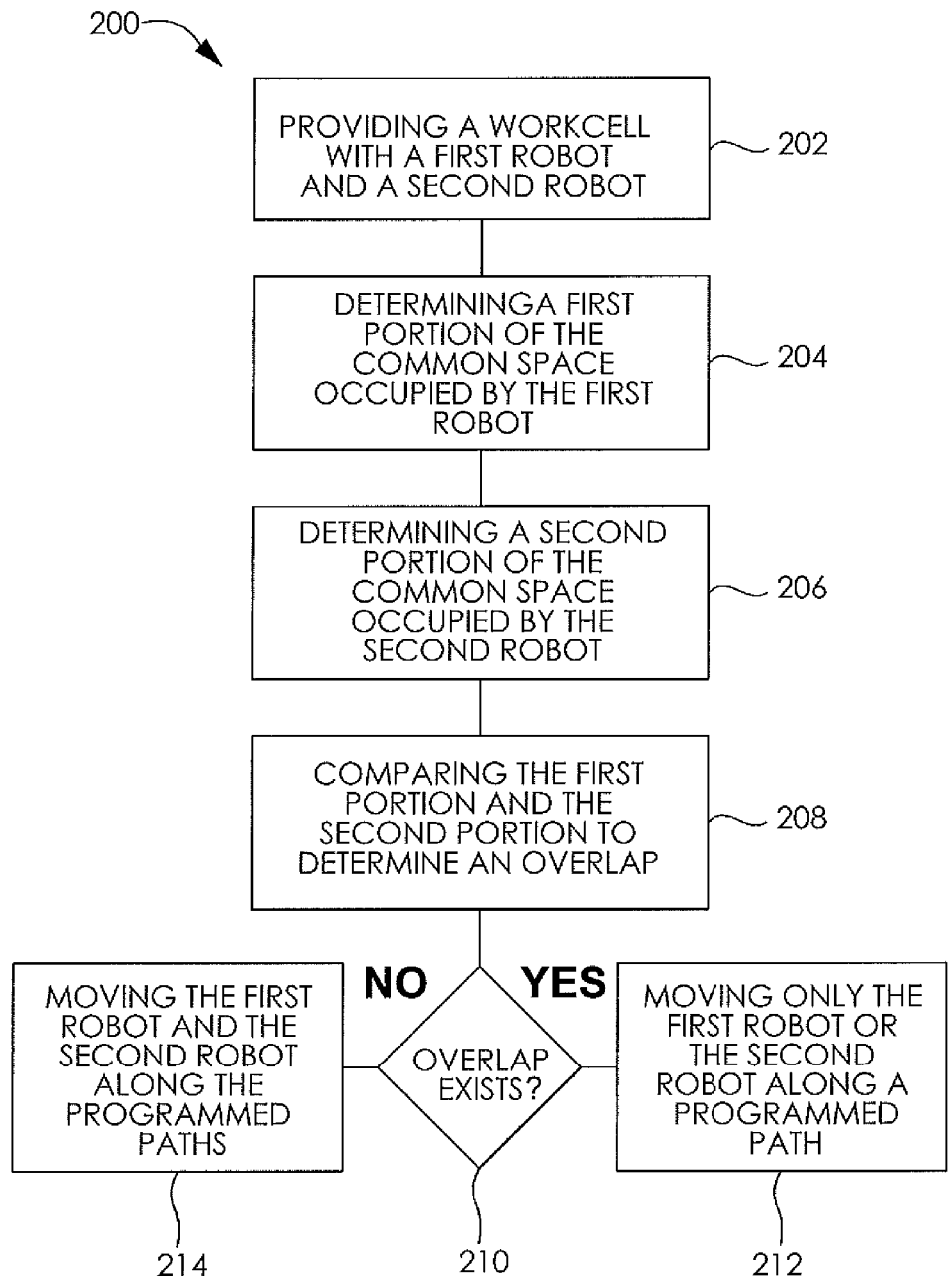
FIG. 2 is a process flow diagram depicting an interference check automatic zone method according to the present disclosure.

An exemplary sequence of instructions according to the present disclosure is shown in FIG. 2. The sequence of instructions includes an interference check automatic zone method 200. The interference check automatic zone method 200 first includes an initial step 202 of providing the at least one common space 10 within the workcell 4. The initial step 202 is followed by a first determination step 204 and a second determination step 206. The first determination step 204 includes determining the first portion 12 of the common space 10 that is occupied during the movement of the first robot 6 along the first programmed path. The second determination step 206 includes determining the second portion 14 of the common space 10 that is occupied during the movement of the second robot 8 along the second programmed path. It should be appreciated that the first and second portions 12, 14 may be determined automatically, i.e., without necessitating a user specified zone of operation for each robot, as is known in the art. The first portion 12 and the second portion 14 are then compared in a comparison step 208 to determine if an overlap 210 exists therebetween.

As a nonlimiting example, the first and second determination steps 204, 206 may be conducted in substantially real time during an initial operation of the robotic system 2 with the first and second robots 6, 8. The initial operation may be conducted with the first and second robots 6, 8 in a lockdown mode to avoid any potential collisions thereof. In another example, the first and second determination steps 204, 206 may be conducted by performing offline runs of the first and second programmed paths, for example, to identify the first and second portions 12, 14 of the common space 10 that may be occupied by the robots 6, 8 during the real time operation. The first and second portions 12, 14 identified during the first and second determination steps 204, 206 may further be retained on the memory, for example, and reused during subsequent operations of the first and second robots 6, 8. It should be understood that the programmed paths or trajectories of the robots' motion is thereby pre-processed and reserved to militate against a collision thereof.

First and second movement steps 212, 214 for the first and second robots 6, 8 are selected in response to the existence of the overlap 210. If there is the overlap 210 between the first portion 12 and the second portion 14, collision of the robots 6, 8 is deemed likely and the first movement step 212 is selected. The first movement step 212 includes moving only one of the first robot 6 along the first programmed path and the second robot 8 along the second programmed path. If there is no overlap 210 between the first portion 12 and the second portion 14, collision of the robots 6, 8 is deemed unlikely and the second movement step 214 is selected. The second movement step 214 includes moving the first robot 6 along the first programmed path and moving the second robot 8 along the second programmed path.

The first and second determination steps 204, 206 may be conducted by any means known in the art. In one particular embodiment according to the present disclosure, the first and second determination steps 204, 206 may include the step of representing at least one of the common space 10, the first portion 12, and the second portion 14 with at least one voxel model 300 having at least one voxel 302, such as is illustratively shown in FIGS. 3 to 6. The voxels 302 are volume elements that represent value on a regular grid in a three dimensional space. The comparison step 208 may include the step of determining whether the overlap 210 exists between a first voxel model 300 representing the first portion 12 and a second voxel model 300 representing the second portion 14, for example. The voxel model 300 is generally represented by the plurality of voxels 302 that approximate a shape of various components, such as a base, an arm, and a tool, of the first and second robots 6, 8.

Figure 3:
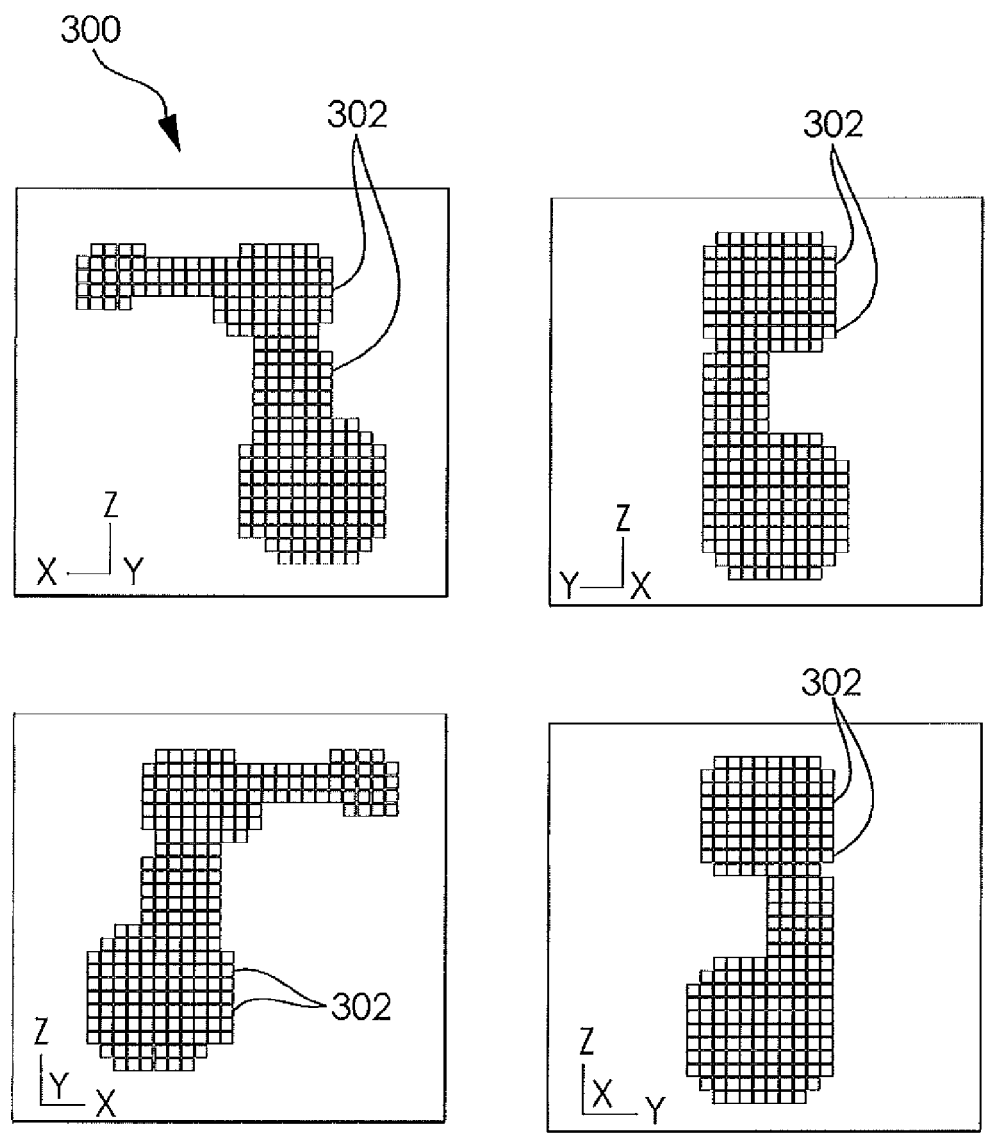
FIG. 3 shows a voxelized model of one of the first robot and the second robot depicted in FIG. 1.
Figure 4:
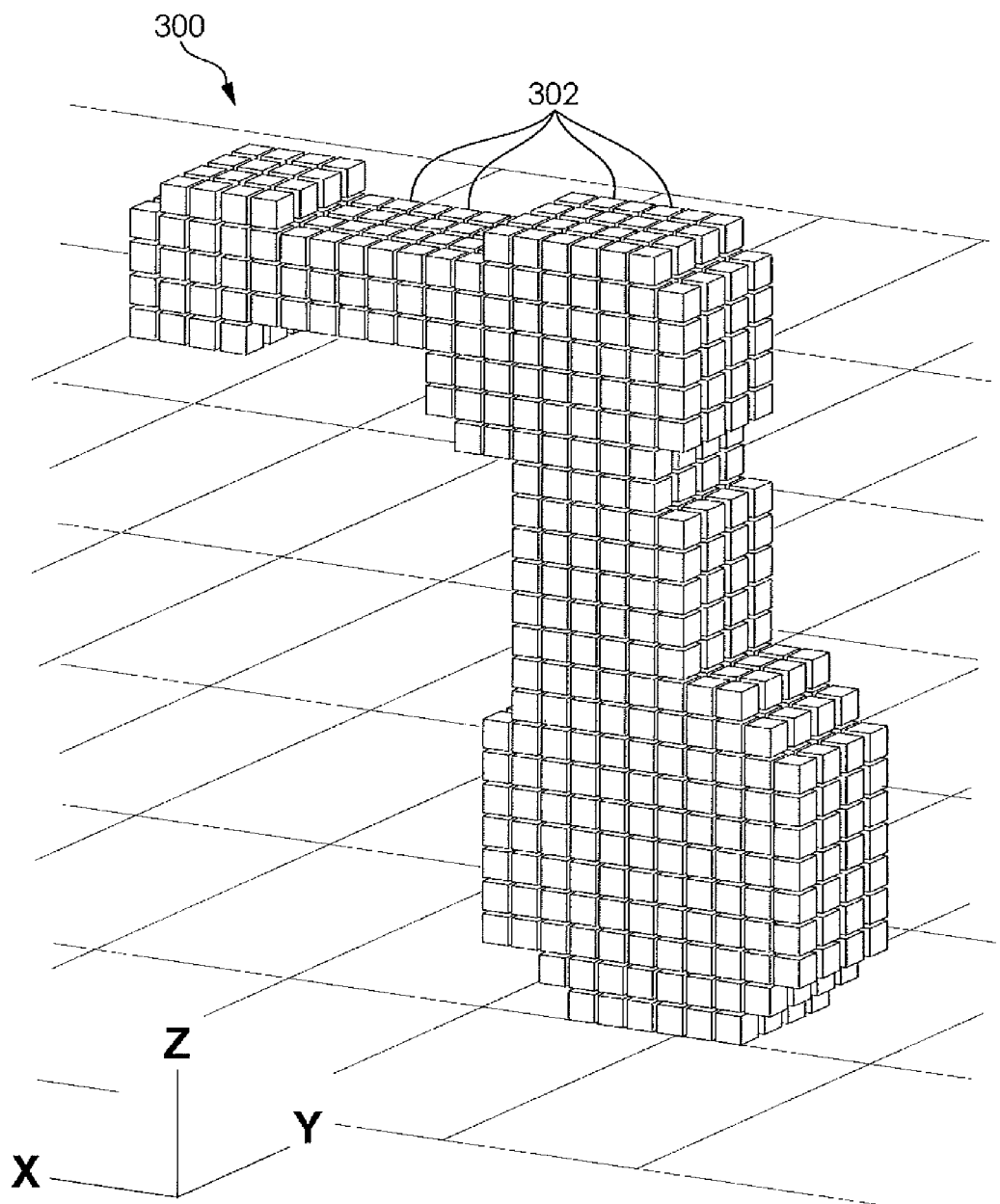
FIG. 4 is an isometric view of the voxelized model depicted in FIG. 3.

With reference to FIGS. 3 and 4, an illustrative voxel model 300 may include a plurality of voxels disposed at coordinates along an X-axis, a Y-axis, and a Z-axis. The voxel model 300 is configured to depict a three dimensional volume of the common space 10 that is occupied by at least one of the first robot 6 and the second robot 8. The voxel model 300 may be in the form of a data file generated and saved to the controller 16, 18 or to another computer readable medium or memory, for example. In certain embodiments the voxel model 300 is dynamic and includes a plurality of voxel models 300 associated with a sequence of the robotic movements. The dynamic voxel model 300 may be employed to depict the three dimensional volume of the common space 10 that is occupied during the movements of at least one of the first robot 6 and the second robot 8. Each automatic zone is derived from accumulation/superimposition of multiple snapshots of voxel models 300, each snapshot is taken at one or more ITP intervals.

Figure 5:
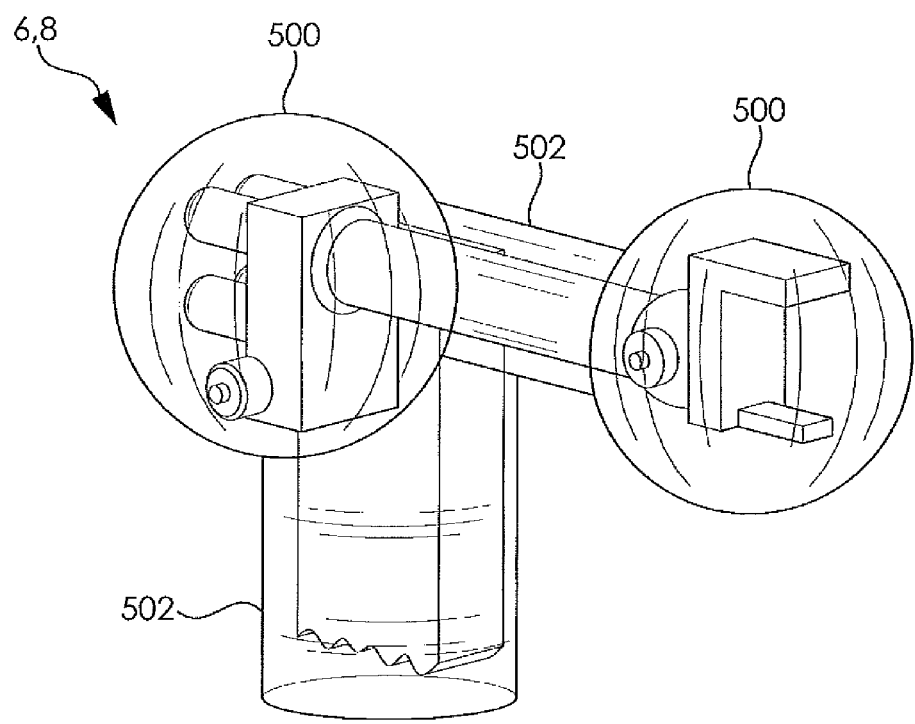
FIG. 5 shows an enlarged view of one of the first robot and the second robot depicted in FIG. 1, having a voxelized model formed by voxelized spheres and cylinders overlayed on one of the first robot and the second robot.
Figure 6:
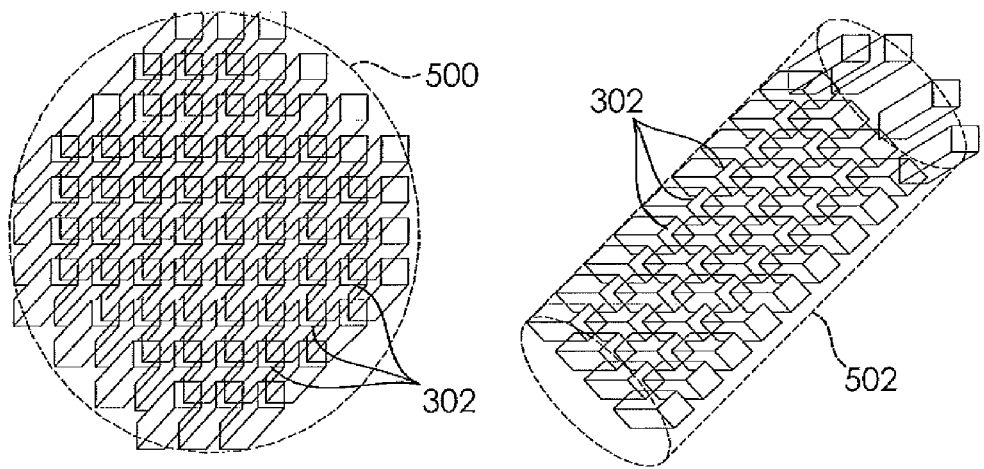
FIG. 6 shows the voxelized spheres and the voxelized cylinders depicted in FIG. 5 formed from a plurality of voxels.

Referring now to FIGS. 5 to 6, the voxel models 300 of the first and second robots 6, 8, may include at least one a voxelized sphere 500 and a voxelized cylinder 502 to represent the three dimensional volume occupied by the first and second robots 6, 8. As described further herein, the voxelized spheres 500 and the voxelized cylinders 502 may represent the various components, such as a base and an arm, of the first and second robots 6, 8. The voxelized spheres and cylinders 500, 502 generally include the plurality of voxels 302 disposed relative one another to approximate the general shapes and boundaries of the first and second robots 6, 8.

One of ordinary skill in the art should understand that the voxelized spheres 500 and cylinders 502 may be generated by any suitable means. For example, the voxelized sphere may 500 may be approximated by first projecting an exemplary sphere representative of the robot 6, 8 components onto an X-Y plane. A smallest cylinder "A" that encloses the sphere is then identified. The same sphere is then projected onto a Y-Z plane and the smallest cylinder "B" that encloses the sphere is identified. The same sphere is then projected onto a Z-X plane, and the smallest cylinder "C" that encloses the sphere is identified. The voxelized sphere 500 is then approximated by identifying the intersections of the "A", "B", and "C" cylinders.

In another embodiment, the voxelized sphere 500 may be approximated by first finding a smallest box that encloses a sphere representative of the robot 6, 8 component. The box has a volume occupation "A". The voxel volume occupation "B" that is inside the box "A" and outside the sphere is then identified. The voxelized sphere 500 is then approximated by subtracting the volume "B" from the volume "A".

The voxelized sphere 500 may alternatively be approximated by identifying an intersection of the exemplary sphere and the X-Y plane. The intersection includes the center of the sphere along the Z axis and forms an intersected circular plate "A1". The circular plane "A1" is assigned an arbitrary height and the voxel occupation of the intersected circular plate "A1" is subsequently identified. Further circular plates "A2", "A3" ... "A(n)", are located by shifting the intersection of the exemplary sphere and the X-Y plane along the Z axis, and the volume occupations thereof are likewise identified. The voxelized sphere 500 is then approximated by integrating each of the voxel occupations identified for the circular plates of the exemplary sphere.

The voxelized cylinder 502 may be approximated by identifying a left hemisphere/whole sphere voxel occupation "A", identifying a right hemisphere/whole sphere voxel occupation "B", and identifying a voxel occupation "C" of multiple circular plates between the left and the right hemispheres. A base circular plate which is perpendicular to a base line is then created. The base line connects the two hemispheres at the ends of the cylinder. Subsequent circular planes can be derived by shifting the base circular plate along a Z axis. Alternatively, a voxel occupation of the base line may be calculated, and the base line subsequently shifted to fill the entire area between the two hemispheres. The voxelized cylinder 502 is subsequently approximated by integrating each of the "A", "B", and "C" voxel occupations.

An alternative method for approximating the voxelized cylinder 502 includes first identifying a smallest box that may enclose an exemplary cylinder representative of the robot component. The box has a volume occupation "A". A voxel volume occupation "B" that is inside the box and outside the cylinder is then identified. The voxelized cylinder 502 is subsequently approximated by subtracting the voxel occupation "B" from the voxel volume occupation "A". One of ordinary skill in the art should understand that other means suitable for approximating the voxelized spheres 500 and cylinders 502 representative of the robot 6, 8 components may be employed as desired.

Voxelization may also be determined similarly from any arbitrary CAD surface or volume which can represent the robot, arm dressout, and tooling.

Voxelization is a very efficient method of representing the space occupied by a robot motion segment. The voxelization process has some computational overhead to create the voxelized space, but the run-time component is very efficient. Once a space is voxelized, the maximum storage requirement of a voxelized space is fixed, no matter how complex or how much of the common space is occupied by the robot during the motion path. The run-time checking for interference between voxelized spaces is very efficient. Although the preferred embodiment provides for the interference check automatic zones to be represented by voxelized regions, any method of volumetric or surface representation of the space occupied by a robot during a motion path can be used.

Further embodiments avoid collision during programmed motion, motion initiated by jogging, or motion initiated by other means. They also protect a moving robot from colliding with a stationary robot or with other fixed objects or other defined regions in the workcell. For programmed motion the voxelization process, or other interference check automatic zone modeling process, can take place during offline or during a test run and the voxelized data efficiently stored for later retrieval. This process can also occur real-time as a new motion path is determined as from a new program, robot jogging, or from motion initiated by other means. For these cases the sequence of instructions may be determined by use of a teaching device or by the other means which initiates the motion. The actual motion is not allowed to commence until the process is completed and no interference with this interference check automatic zone and other occupied interference check automatic zones.

In further embodiments, at least one of the first portion 12 and the second portion 14 of the common space 10 may include a tooling space and dressout assembly (e.g. ArcTool wire feeder) occupied by a tooling attached to at least one of the first robot 6 and the second robot 8. The step of determining the overlap 210 also may include comparing at least one of the first portion 12 and the second portion 14 with a third portion of the common space 10 that occupied by a non-robot obstacle (not shown). The obstacle can be manually specified by a set of parameters used to define the size, shape, and location of the common space 10, as desired. In another example, the method 200 may further include the step of determining the third portion of the common space 10 occupied by the obstacle. It should be understood that the third portion of the common space occupied by the non-robot obstacle may also be represented by voxels 302 in a similar voxel model 300, as desired.

The method 200 of the present disclosure may further include the step of determining an unoccupied portion of the common space 10 after at least one of the first robot 6 has moved along the first programmed path and the second robot 8 has moved along the second programmed path. The unoccupied portion of the common space 10 may then be released for use by another robot following a further programmed path or trajectory, as desired. In a further embodiment, the method 200 may include the step of transferring the coordinates of the first portion 12 and the second portion 14 of the common space 10 to the at least one controller 16, 18 for further use according to the method 200 of the present disclosure. The controller 16, 18 may then be employed to conduct at least one of the first and second determination steps 204, 206 as described herein, and convert the coordinates into the voxel models 300 representative of the first and second portions 12, 14.

A skilled artisan should appreciate that, upon determining whether the overlap exists between the first and second portions 12, 14 of the common space 10, the respective movements of the first robot 6 and the second robot 8 may determined by priority values. As a nonlimiting example, the priority values of the first and second robots 6, 8 may be based on a first-in-first-out system. In another example, one of the first and second robots 6, 8 may always have a higher priority value than the other of the first and second robots 6, 8. The higher priority value may be based on a predetermined user setting for priority of the robots 6, 8 in the robotic system 2. In a further example, the priority values may be selected based on the availability of unoccupied portions within the common space 10. A skilled artisan may assign the desired priority values to the first and second robots 6, 8, as desired.

In a further embodiment, the method 200 further includes the step of analyzing the plurality of programmed paths for the existence of the overlap 210 that may result in a deadlock condition. An operating sequence of the plurality of programmed paths may subsequently be adjusted, as desired, to militate against the occurrence of the deadlock condition. The operating sequence may be adjusted manually or automatically, for example, based on priority values, as desired.

It should be appreciated that the interference check automatic zone system 2 and method 200 of the present disclosure advantageously provides a competitive advantage over conventional multi-arm robotic systems. The system 2 and method 200 provides a three dimensional and real time collision avoidance. The system 2 requires minimal programming because the system 2 militates against the need of specifying or teaching interference zones. Production down-time is also thereby reduced.

One of ordinary skill in the art should also appreciate that the employment of voxelized spheres 500 and cylinders 502 minimizes processing requirements typically associated with generation of robotic models. Movements of the first and second robots 6, 8 are communicated to the system 2 in advance, for example, by offline generation of the voxel models 300. Likewise, programmed paths or trajectories of the first and second robots 6, 8 are reserved without collision. A process path is a sequence of motions during which an application process, such as cutting, welding, grinding, routing, painting, dispensing, or another similar processes takes place. It is generally important that once a process path is started the entire process path be completed without interruption. It should also be appreciated that critical process paths of the first and second robots 6, 8 are likewise protected according to the present method 200.

The system 2 supports multiple robot arm collision avoidance within the same controller 16, 18 and across multiple controllers 16, 18, as desired. The system 2 and method 200 further provides for a simplified robot configuration and militates against the need for an I/O handshaking protocol, as is conducted with certain prior art systems and methods. The interference check automatic zone system 2 and method 200 simplifies the configuration of multiple arm interference checks and militates against multiple robot arm deadlock.

Interference prevention and deadlock prevention are closely related. Interference occurs when two robots attempt to occupy the same physical space. One method of interference prevention involves checking the space that is or will be occupied in the current motion command by all robots and stopping one or more robots before the interference occurs. This type of interference prevention has the major disadvantage that it is very prone to deadlock when one or more of the stopped robots currently occupies the space that is or will be needed by another robot and the stopped robot cannot proceed because it continues to be blocked by another robot.

Another method of interference prevention is to set up interference zones manually by programmatically inserting enter and exit zone commands in the robot programs. These commands would provide communication with a PLC or other robots to facilitate allowing only one robot arm to occupy a specified zone at one time. For a single zone there is little concern. The primary issue would be one of priority; who would get the zone first if multiple robots are waiting on it when it becomes available. However, for multiple zones, it is very easy for deadlock to occur. For instance, it is easy to see for neighboring zones if each robot currently occupies one zone and the next motion is inside the zone occupied by the other robot. In this case each robot will wait forever for the other robot to give up the desired zone. A deadlock condition will occur.

The system and method according to this invention eliminates the deadlock condition in the above cases by determining the deadlock-free motion statements prior to execution of the motions that have potential deadlock conditions. This determination of deadlock-free motion statements can be done offline, outside normal execution, or it can be done during normal production execution. If there is sufficient CPU processing time available, the determination during normal production execution provides the most flexibility to respond to dynamic conditions such as changes in I/O timing or the timing of external events or sequences. For minimal CPU impact the determination is done offline where many permutations of programming sequences can be analyzed and an optimized sequence of execution may be found.

The system and method according to the invention does not require a previously known deadlock-free sequence. The system and method will automatically determine the potential deadlock conditions and identify a way to avoid these conditions. The system and method does not require priority values to prevent deadlock. The system and method prevents interference conditions and at the same time prevents the possibility of deadlock conditions to exist.

Figure 7:
FIG. 7 shows a deadlock free matrix and associated program listings according to the invention.

There is shown in FIG. 7 a "Deadlock Free Matrix" 400 of line numbers for an "Original Program A" listing 401 to be run by a first robot and an "Original Program B" listing 403 to be run by a second robot. Shaded cells in the matrix 400 represent an ascending convex hull defining a deadlock free region. A majority of the shaded cells represent program line pairs that have interference during travel on a path from line "i−1" to line "i" of one program and line "j−1" to line "j" in the other program. The remaining cells are required to complete the ascending convex hull. The cells in the matrix 400 can be designated in a form (i, j) where "i" is the program "A" line number and "j" is the program "B" line number. Thus, the interference cells are (3,6; 3,7; 4,5; 4,6; 4,7; 5,4; 5,5; 5,6; 5,7) and the remaining cells are (3,4; 3,5; 4,4).

For example, if program "A" is on line 3 and Program "B" is on line 5 then a deadlock condition exists because if "A" tries to move to line 4 there will be interference with "B" on line 5 and if "B" tries to move to line 6 then there will be interference with "A" on line 3. Therefore, neither robot can proceed. By completing the deadlock zone from "A" lines 3 to 5 and "B" lines 4 to 7, only one program, "A" or "B", can occupy this zone at a time. This is identified as Zone[1] in the example programs shown as "New Program A" listing 402 and "New Program B" listing 404.

FIG. 8 shows an example wherein an "Interference Matrix" 405 can be subdivided into three deadlock free zones: Zone [1]; Zone[2]; and Zone [3]. The interference cells are (3,3; 3,4; 3,5; 3,6; 3,7; 4,5; 4,6; 4,7; 5,4; 5,5; 5,6; 5,7; 6,6; 6,7). Zone[1] includes the cells (3,3; 3,4; 3,5; 3,6; 3,7), Zone[2] includes the cells (4,5; 4,6; 4,7; 5,4; 5,5; 5,6; 5,7), and Zone [3] includes the cells (6,6; 6,7). An ascending convex hull is created through the cell (4, 4), being a virtual interference, such that the three convex hulls can be created and the total area is convex in an ascending manner. The three zones are then incorporated in "New Program A" listing 406 and "New Program B" listing 407. There is no case where in any interference free line pair combination that at least one program can advance to the next line without interference.

Figure 9:
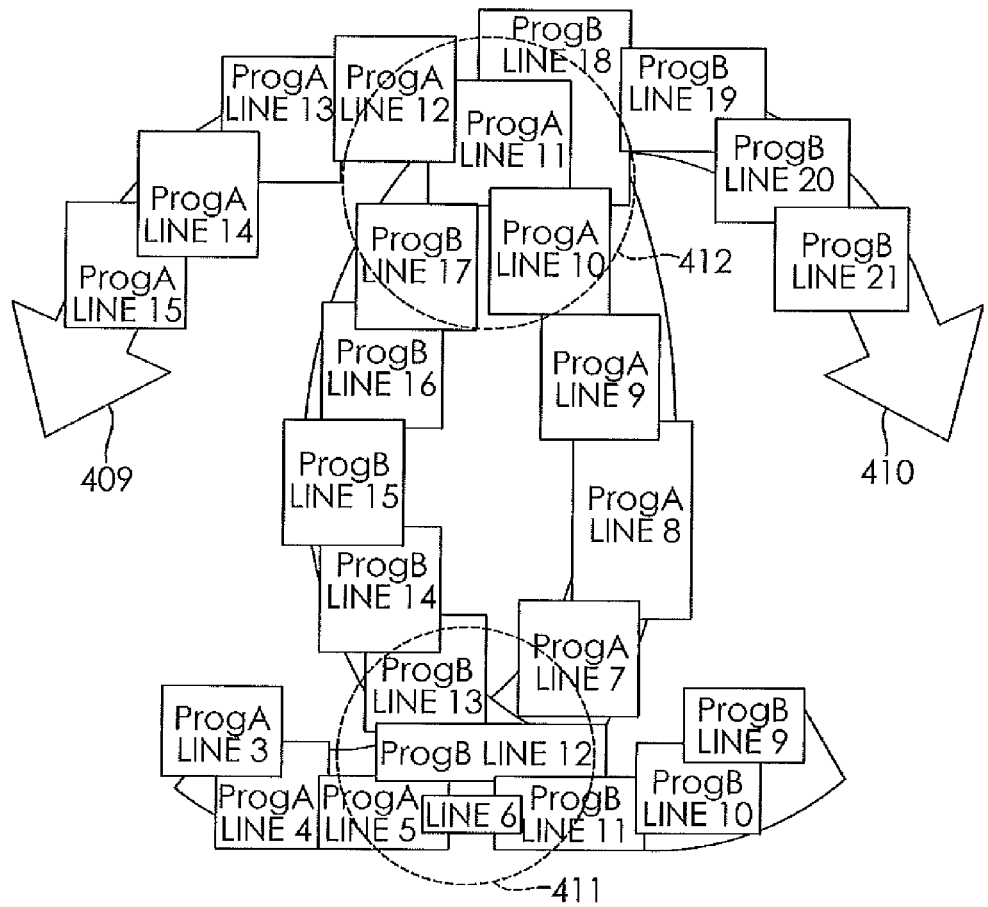
FIG. 9 shows paths and associated tables combining multiple deadlock regions into a single deadlock free region.

FIG. 9 shows an example of a pair of programs that have multiple interference regions and two deadlock regions where deadlock can exist. A "Program A" traces a path 409 from line 3 to line 15. A "Program B" 410 traces a path from line 9 to line 21. The programs have a first deadlock region 412 and a second deadlock region 411 as shown in the paths and in a Table 413. A simple method of making a single deadlock region is to combine all interference regions and intermediate non-interference regions into a single region as shown in Table 414 which region will by nature be deadlock free.

Figure 10:
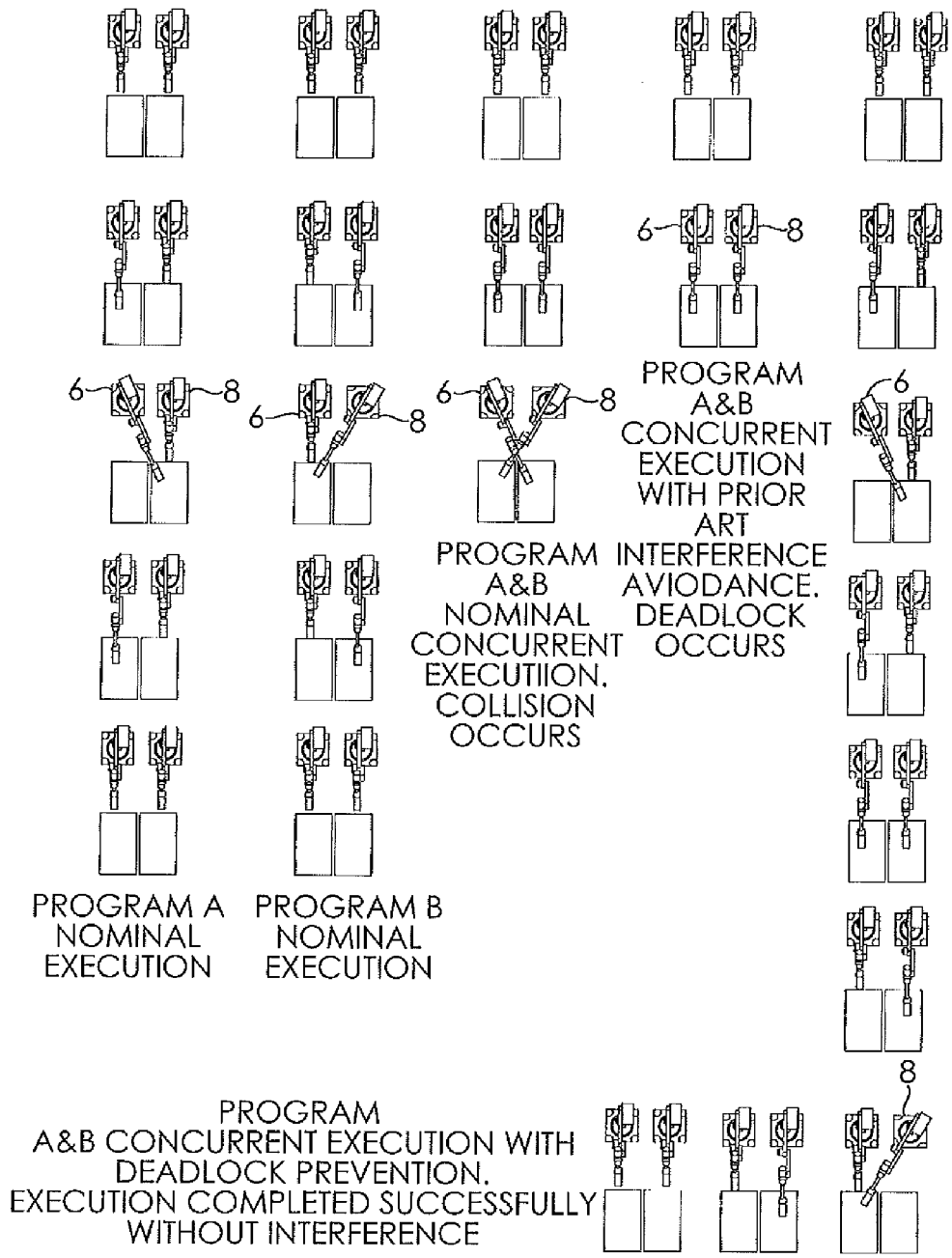
FIG. 10 shows several robot program execution sequences without and with deadlock prevention according to the invention.

FIG. 10 shows five sequences of the robots 6, 8 running "Program A" and "Program B" respectively. In the first sequence at the far left, the robot 6 runs the "Program A" without the robot 8 moving. In the next sequence to the right, the robot 8 runs the "Program B" without the robot 6 moving. In the middle sequence, the robots 6, 8 run the respective programs concurrently and collision occurs. The next sequence to the right shows the robots 6, 8 running the respective programs concurrently with a prior art interference avoidance feature that causes deadlock. The sequence on the far right shows the robots 6, 8 running the respective programs concurrently with deadlock prevention according to the invention such that both programs are completed without interference.

The system and method described above will automatically add and/or modify program statements to both prevent collisions and manage through potential deadlocks. In some cases, the automatic wait command that is issued may cause the overall cycle time to increase for a given job. Where increased cycle time is not acceptable, system and method according to the invention can recommend or automatically create re-sequenced paths that will enable the robots to run through the programs without stopping. In other words, if there is a portion of the paths where two robots will occupy the same space at the same time, the system and method would automatically recommend a new path sequence (imagine welding the spots in a different order) so that this condition is eliminated. This feature of re-sequencing the program instructions has potential for use for paintshop applications.

If conditional execution statements occur in the program then the analysis may include all combinations of sequential execution. Or, for simplicity, the program segments included in the conditional branch regions could be treated as independent. Typically, the robot programmer will teach such conditional regions so the entry and exit paths to the region do not have interference with other robots and so the independent treatment can be practical. However, if the entry or exit paths to the conditional regions have interference with other robots then the multiple combinations of the conditional and non-conditional regions should be analyzed to guarantee no interference and no deadlock.

One of the advantages of this method is that the same mechanism that can eliminate deadlock conditions can also eliminate interference during normal program motion. So, the real-time checking of robot-robot interference can be eliminated during normal program motion. This can save significant CPU utilization allowing processing time to be used for other purposes such as a faster interpolation rate or shorter interpolation time. During error conditions or when the program is not running, a reduced CPU usage of interference checking, such as proposed in the co-pending U.S. patent application Ser. No. 12/124,430, titled "Multi-Arm Robot System Interference Check Via Three Dimensional Automatic Zones", could be used to prevent interference.

The space occupied by a program can be a function of physical space, time, program sequence, line number, percentage of completion of program or line, or state change related to robot, program, or system. The interference region and the deadlock region are correlated by the same function which defines the occupied space.

The manner to avoid deadlock can be handled in a number of ways. The easiest way is to expand the interference regions such that they prevent deadlock as well as interference as shown in FIG. 9. Expanding the interference regions such that there is only one interference region for the entire program will guarantee the system is deadlock free, but if cycle time is important some sort of sequence control and/or multiple interference regions may be used. Another way is to provide an execution sequence outside the interference regions such that deadlock is prevented. This can be done simply by having a first robot wait for a second robot to complete some portion of a program execution where deadlock conditions might exist before the first robot proceeds.

There are several ways the occupied space can be determined. The simplest way is that the occupied space is purely the cumulative space occupied by a robot throughout the program execution. When multiple robots have their occupied space determined this way, then the interference region is simply the space which is the intersection of the cumulative occupied space for each robot. Allowing only one robot to enter this space at a time will prevent both interference and deadlock.

Another way is to determine the occupied space as a function of time. At each point in time there is a space occupied by each robot. By representing the occupied space as the integration of time over a specified interval the occupied space can be represented as a series of discrete spaces correlated to time. The interference regions are the intersections of the robots at the same time or time interval. Interference can be avoided by allowing only one robot to be in an interference region at a time. As the relative time changes due to the sequence control the time base must be adjusted to correlate the new time after the sequence control has been applied.

For the above time based method, the time may be represented as a time interval number. This way the total elapsed time becomes less important and the interference region can be represented as the matrix of interval numbers. If there is an interference at a specific interval state, then that state must not be allowed to occur because a collision can happen in that interval state.

Similarly, the program sequence can be represented as line numbers, percentage of completion, program state, etc. For any such sequential representation there can be a defined representation of interference as a function of the chosen parameter. The objective to avoid interference is to avoid the states of the collection of functions where interference exists. For functions that can be represented as sequential discrete intervals or sequential states this can be represented as an interference matrix as shown in FIG. 8. The interference matrix contains the interference region. Of course, a matrix is only one way of representing the data, but the matrix can be a more visual representation. Generally the matrix is sparce, so any sparce matrix technique would also apply to the representation.

State definition, such as I/O states or process or other states can be used to define the regions. As long as the states have sequential meaning or can be defined to represent sequential activity associated with robot position and occupied space they can be used for the parametric representation of the interference and deadlock regions.

Once the interference matrix has been determined, one method of deadlock prevention is to avoid any "trap" of the monotonic increasing of sequence number where interference would block forward sequencing. By making the interference matrix ascendingly convex, both deadlock and interference are avoided. This ascendingly convex interference matrix can be termed the deadlock matrix. The deadlock matrix contains the deadlock region as shown in FIG. 7. Like the interference, the deadlock matrix is only one way of representing the data.

There are many means to avoid deadlock and interference once the deadlock matrix has been determined. The simplest means is to insert instructions in the program to adjust execution timing so the deadlock region of the deadlock matrix is avoided. Adding instructions to the program has the advantage that the precise nature of the execution timing can be determined by simply viewing the program. Other means allow the timing to be determined outside actual program modification.

The parametric definition of interference and deadlock regions provides a general method to avoid interference and deadlock. This representation of the regions allows various program control by various factors.

Also, to reduce CPU utilization, the actual programs can be updated to include zone and sequence information so all the necessary information to avoid deadlock conditions is contained in the programs. This eliminates the need for real-time checking of the program sequences, interferences, and potential deadlock conditions.

Figure 11:
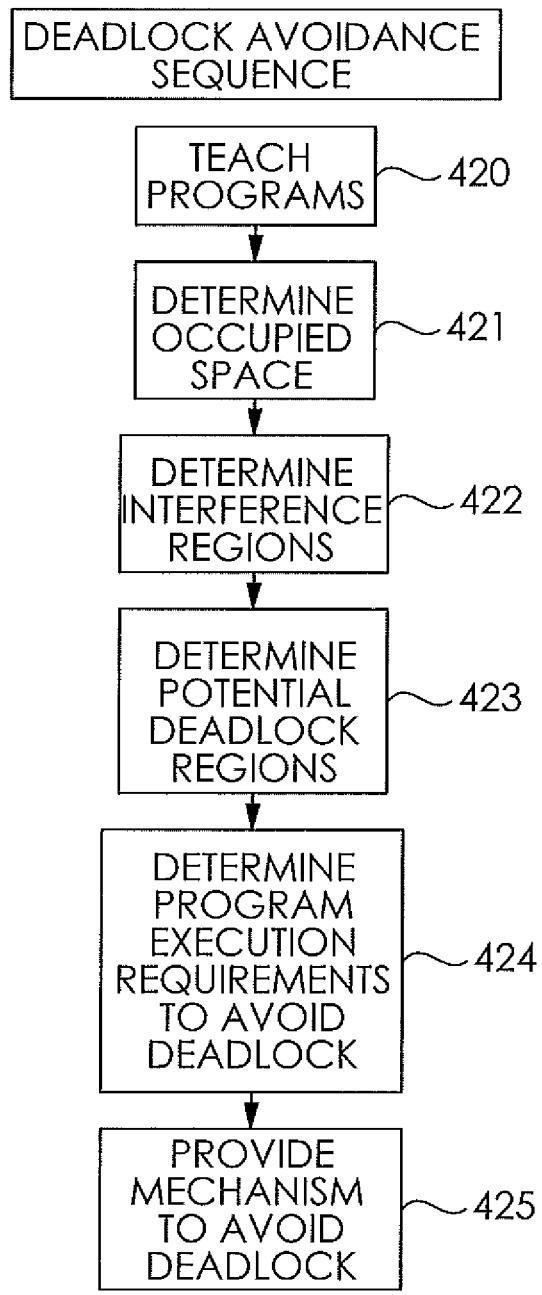
FIG. 11 is a flow diagram of a deadlock avoidance sequence in accordance with the invention.

FIG. 11 is a flow diagram of a deadlock avoidance sequence according to the system and method of the invention. In a step 420, the programs are taught to the robot controllers 16, 18. In a step 421, an occupied space is determined. Then, interference regions are determined in a step 422. Potential deadlock regions are determined in a step 423. In a step 424, program execution requirements to avoid deadlock are determined. Finally, a mechanism to avoid deadlock, as described above, is provided in a step 425.

Figure 12:
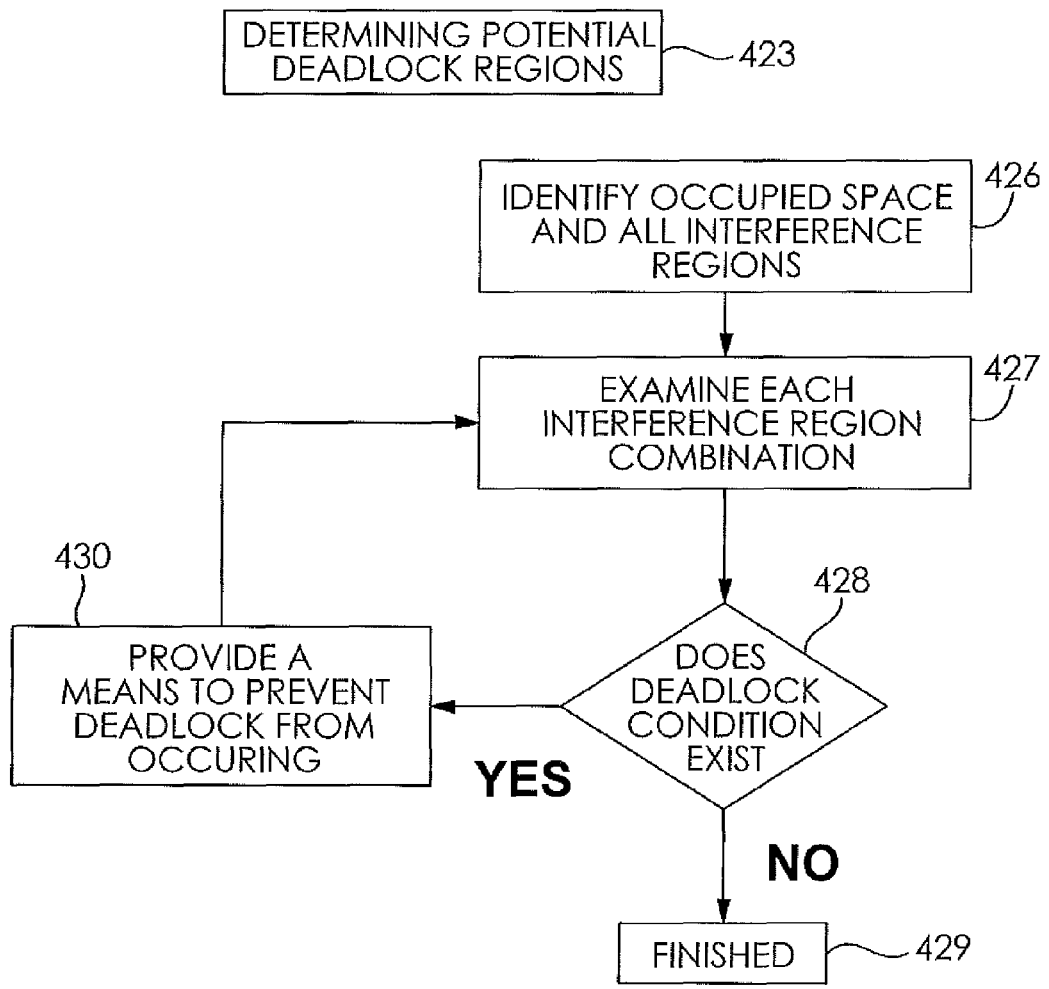
FIG. 12 is a flow diagram for determining potential deadlock regions in accordance with the invention.

The step 423 is shown in more detail in FIG. 12. In a step 426, there are identified the occupied space and all interference regions. In a step 427, each interference region combination is examined. A check for "Does deadlock condition exist" is made in a decision step 428. If the outcome is "NO", the step 423 is finished in a step 429. If the outcome is "YES", a step 430 provides a means to prevent deadlock from occurring and the method returns to the step 427.

While certain representative embodiments and details have been shown for purposes of illustrating the invention, it will be apparent to those skilled in the art that various changes may be made without departing from the scope of the disclosure, which is further described in the following appended claims.

What is claimed is:

1. A method for preventing deadlock of a pair of robots which have a common workspace, each of the robots being controlled by an associated program wherein when the programs are executed concurrently to generate normal program motion each of the robots occupies at least a portion of the common workspace during a portion of execution of the associated program, said method comprising the steps of:
 prior to the normal program motion, determining portions of the common workspace occupied by the robots by initial operation in a lockdown mode or an offline run according to the programs including representing the occupied portions of the common workspace with voxel models;
 determining at least one interference region wherein the portions of the common workspace occupied by the robots overlap by comparing the voxel models to determine the at least one interference region;
 analyzing the at least one interference region and determining where at least one deadlock condition of the two robots can occur; and
 avoiding the at least one deadlock condition during execution of the programs in the normal program motion by automatically determining a mechanism to avoid the at least one deadlock condition and associating the mechanism with at least one of the programs before execution of the programs in the normal program motion.

2. The method according to claim 1 wherein the mechanism is at least one deadlock-free motion statement.

3. The method according to claim 2 wherein the at least one deadlock-free motion statement is associated by adding to at least one of the programs.

4. The method according to claim 2 wherein the at least one deadlock-free motion statement is associated by modifying at least one instruction in at least one of the programs.

5. The method according to claim 2 wherein the at least one deadlock-free motion statement is associated by re-sequencing instructions in at least one of the programs.

6. The method according to claim 2 wherein the at least one deadlock-free motion statement is associated by adding a wait command to at least one of the programs.

7. A non-transitory computer readable media containing instructions executable by a computer to perform a method for preventing deadlock of a pair of robots which have a common workspace, each of the robots being controlled by an associated program wherein when the programs are executed concurrently to generate normal program motion each of the robots occupies at least a portion of the common workspace during a portion of execution of the associated program, the method comprising:
 prior to the normal program motion, the instructions determining portions of the common workspace occupied by the robots by initial operation in a lockdown mode or an offline run according to the programs wherein the instructions represent the occupied portions of the common workspace with voxel models;
 the instructions determining at least one interference region wherein the portions of the common workspace overlap by comparing the voxel models to determine the at least one interference region;

the instructions analyzing the at least one interference region and determining where at least one deadlock condition of the two robots can occur; and the instructions avoiding the at least one deadlock condition during execution of the programs in the normal program motion by automatically determining a mechanism to avoid the at least one deadlock condition and associating the mechanism with at least one of the programs before execution of the programs in the normal program motion.

8. The method according to claim 7 wherein the mechanism includes at least one deadlock-free motion statement.

9. The method according to claim 8 wherein the at least one deadlock-free motion statement is associated by adding to at least one of the programs.

10. The method according to claim 8 wherein the at least one deadlock-free motion statement is associated by modifying at least one instruction in at least one of the programs.

11. The method according to claim 8 wherein the at least one deadlock-free motion statement is associated by re-sequencing instructions in at least one of the programs.

12. The method according to claim 8 wherein the at least one deadlock-free motion statement is associated by adding a wait command to at least one of the programs.

13. A method for preventing deadlock of a plurality of robots which have a common workspace, each of the robots being controlled by an associated program wherein when the programs are executed concurrently to generate normal program motion each of the robots occupies at least a portion of the common workspace during a portion of execution of the associated program, said method comprising the steps of:

prior to the normal program motion, determining portions of the common workspace occupied by the robots by initial operation in a lockdown mode or an offline run according to the programs including representing the occupied portions of the common workspace with voxel models;

determining at least one interference region wherein the portions of the common workspace overlap for at least two of the robots by comparing the voxel models to determine the at least one interference region;

analyzing the at least one interference region and determining where at least one deadlock condition of the at least two robots can occur; and avoiding the at least one deadlock condition during execution of the programs in the normal program motion by automatically determining at least one deadlock-free motion statement and associating the statement with at least one of the programs before execution of the programs in the normal program motion.

* * * * *